Dec. 27, 1960

W. N. MILLER, JR 2,966,094

PROJECTION DISPLAY APPARATUS

Filed July 22, 1958

*INVENTOR.*
WILLIAM N. MILLER JR.

BY

ATTORNEYS

Dec. 27, 1960 W. N. MILLER, JR 2,966,094
PROJECTION DISPLAY APPARATUS
Filed July 22, 1958 3 Sheets-Sheet 2

INVENTOR.
WILLIAM N. MILLER JR.
BY
Shoemaker & Mattare
ATTORNEYS

Dec. 27, 1960 W. N. MILLER, JR 2,966,094
PROJECTION DISPLAY APPARATUS
Filed July 22, 1958 3 Sheets-Sheet 3

INVENTOR.
WILLIAM N. MILLER JR.
BY
Shoemaker & Mattare
ATTORNEYS

United States Patent Office 2,966,094
Patented Dec. 27, 1960

2,966,094

PROJECTION DISPLAY APPARATUS

William N. Miller, Jr., Greenville, S.C., assignor to Shop-O-Rama, Inc., Greenville, S.C., a corporation of South Carolina Filed July 22, 1958, Ser. No. 750,266

10 Claims. (Cl. 88—16.2)

The present invention relates to a new and novel display apparatus, and more particularly to a display apparatus adapted to be mounted in an elevated position in such a manner as to be observed from substantially all sides thereof.

The present invention is adapted to be utilized in any type of store or similar place where prospective customers may be influenced by the advertising presented in the display apparatus. The present invention, however, is especially well adapted for use in supermarkets or the like wherein it is mounted in an elevated position, preferably from the ceiling, in a central location in a store. Screen means is provided in the apparatus upon which images are projected, and a sound reproducing system simultaneously provides an audible accompaniement for the film in the form of narrative or music as desired.

The images presented on the screen means of the invention apparatus will ordinarily comprise advertising which is intended to induce customers within the store to buy certain products. This form of advertising is particularly suitable in food markets and provides an ideal advertising medium since the potential customer receives the advertising at the most desirable time, when the customer is in the market ready to buy and is most susceptible to suggestion. It is apparent that the advertising medium provided by the present invention having such a commanding location, being presented at the proper psychological time, and utilizing motion and audibility, represents the ultimate in advertising for products which are sold in self-service stores or the like.

The possibility of advertising in supermarkets has been considered before, and various attempts have been made to design devices suitable for such advertising. For example, advertising displays have been employed wherein a picture is presented on the screen and is provided with an accompanying sound reproduction system. Such prior art devices have provided moderate success, but have not proved adequately successful because of the fact that they may be viewed from only a limited area and, accordingly are not suitable for advertising a variety of products which may be in scattered locations throughout the store.

The present invention overcomes the difficulties encountered in prior art devices by providing an apparatus which is mounted in an elevated position in a central location in the store. The apparatus is provided with a screen means having a plurality of viewing areas disposed in such a manner that regardless of where the customer is in the store, one or more of the viewing areas will be visible such that the customer is continually subjected to the moving picture and sound presented by the apparatus. The screen means of the apparatus is so disposed that the customer in the store can easily view the images being shown on the screen means by merely glancing upwardly from the goods mounted in a conventional manner on the racks within the store.

A major problem involved in any advertising is obtaining the potential customer's attention. In order to attract the customer's attention to the display apparatus according to the present invention, a novel method of projection has been developed which provides an incentive for the customer to continually watch the viewing areas of the apparatus during the time he is in the store. This is accomplished by providing a prize or bonus system wherein the advertising presented by the apparatus is periodically interrupted by numbers which are projected on the viewing areas on the screen means. The conventional push carts as employed in supermarkets are each provided with different numbers, and the person having the push cart with the number projected on the screen is presented with a prize by reporting to the checking counters or an employee of the store while the number is being projected, or immediately thereafter.

It is apparent that when the customers are informed of the aforedescribed bonus system, they will have an incentive for continually glancing up at the apparatus even if they are not interested in the advertising to make sure that they see the numbers when they are projected on the screen means. In this manner, the attention of the customers is continually drawn to the apparatus while the customer is in the store, and the customer will, in this manner, be subjected to the advertising which he will observe each time he glances up at the apparatus. In order for this bonus system to be practical, it is apparent that the apparatus be provided with a means for projecting both advertising matter and numbers. In addition, in order to provide an effective means for continually attracting the attention of the customers, the numbers should not appear on the screen means at regular intervals as the customer would soon become accustomed to the particular time intervals and would not bother to look at the apparatus between times when the bonus numbers are projected. It is also evident that the apparatus must be capable of projecting many different numbers since, if only a few are used, the carts having these numbers would be continually monopolized and would not provide an incentive for the remaining customers in the store.

In order to provide apparatus wherein advertising material can be continuously projected and such advertising material may be periodically interrupted for projecting bonus numbers, applicant employs two sets of projectors, one of which projects the advertising material and the other of which projects the bonus numbers. This is necessary in order to obtain the desired distribution of the numbers both as to the time interval and as to the variety of the numbers. Each of the projectors employed according to the present invention is an automatic slide projector adapted to repeatedly project a plurality of slides in a given sequence.

The entire apparatus according to the present invention is housed within a hollow body means which is suitably suspended from the ceiling of the store and having an exterior appearance which is pleasing to the eye. As illustrated herein, the body means is a four-sided figure, each of the sides having a screen mounted therein. Loud speakers are also mounted in the outer walls of the body means for directing sound outwardly in all directions from the apparatus. Auxiliary speakers may be mounted throughout the store, if desired, in order to provide a more complete sound saturation throughout the area of the store, although it is considered preferable to have the sound in a central location to attract the attention of the customers.

The screens of the apparatus are of conventional rear projection type, and a pair of projectors is associated with each screen for projecting images thereon. A pair of projectors associated with each screen is alternatively operated such that when one is projecting, the other is not projecting.

Sound reproducing apparatus is incorporated in the invention and includes a tape recorder, the output of which is connected to the aforementioned loud speakers. The tape employed with the tape recorder is suitably recorded to provide a continuous running commentary which is adapted to accompany the various slides in the projectors containing the advertising material. The tape is also recorded with suitable control signals which are adapted to provide pulses for remotely operating the advertising unit projectors, thereby causing the slides in the advertising unit projectors to be changed in perfect synchronism with the sound produced in the sound reproducing apparatus of the invention.

A control system is also provided for periodically interrupting the projection of the advertising unit projectors and causing of one cycle of operation of the number unit projectors such that the advertising is interrupted and a number is projected upon the screen means of the invention apparatus for a predetermined interval of time after which the advertising unit projectors are again caused to project the advertising material on the screen means. The control means is in the form of an electric circuit including a timing means which may be adjusted for causing the operating of the number unit projectors at predetermined time intervals.

It is apparent that the above described arrangement provides an apparatus which simultaneously presents a plurality of identical images on different viewing areas facing in different directions such that the images may be viewed from any position around the apparatus. The accompanying sound is in proper timed relationship with the advertising projected on the viewing areas, and the projected advertising material is periodically interrupted by the projection of bonus numbers. An additional feature of the invention lies in the fact that, while a bonus number is being projected, the commentary for the particular portion of advertising matter which has been discontinued continues such that a customer cannot determine that a bonus number is being shown by any interruption in the commentary, but on the contrary, it is necessary for the customer to watch the viewing areas of the apparatus in order to determine if a bonus number is being projected. This is an important feature since it is apparent that if the commentary were only presented while the advertising material was being projected, it would not be necessary for the customer to watch the screen means at all since he could determine when the advertising matter was not being projected merely by the sound. The bonus numbers are projected for a predetermined period of time sufficient to enable the customer to obtain the attention or contact one of the employees of the store to identify the winning number on the push cart in accordance with the number being projected on the screen means.

An object of the present invention is to provide a new and novel display apparatus adapted to be mounted in a central position in a store to provide a visual and audio advertising presentation to customers in the store.

Another object of the present invention is the provision of a display apparatus which can be viewed from substantially all directions thereabout.

A further object of the invention is to provide a display apparatus wherein advertising matter is projected on the viewing areas of the apparatus and bonus numbers or other symbols are periodically projected on the same viewing areas for attracting the attention of the customers.

Yet another object of the present invention is to provide a display apparatus wherein the sound commentary is synchronized with the advertising matter projected on the screen means, and yet the sound is continuous even while the bonus numbers are being projected.

A still further object of the invention is to provide a display apparatus which is efficient and reliable in operation, yet simple and inexpensive in construction.

Other objects and many attendant advantages of the present invention will become more apparent when considered in connection with the accompanying specification and drawings wherein.

Figure 1:
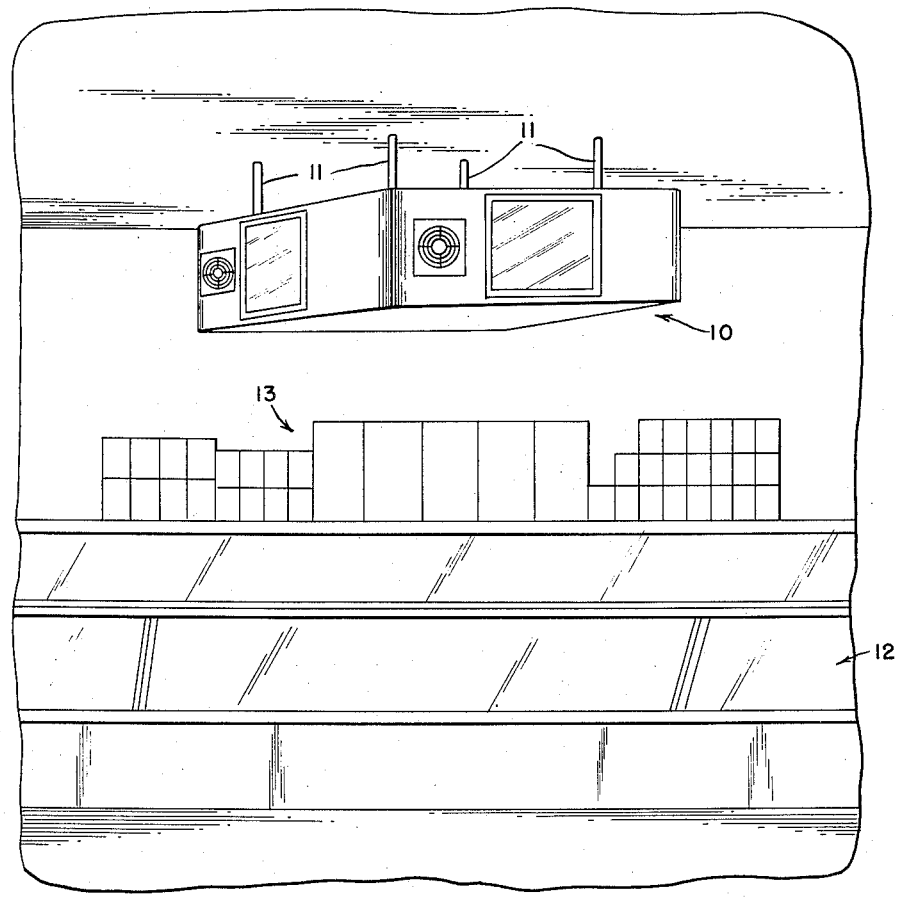
Fig. 1 illustrates the invention apparatus suspended from the ceiling and disposed at a central location in a typical supermarket.

Referring now to Fig. 1 of the drawings, the display apparatus indicated generally by reference numeral 10 is suspended from the ceiling of the store by four tubular supported members 11 extending downwardly and having lower end portions thereof secured to suitable means disposed inside the body means as more fully hereinafter described. A conventional display cabinet 12 is mounted upon the floor of the store and goods indicated generally by reference numeral 13 are stacked upon the upper surface of the display cabinet.

Figures 2, 3:
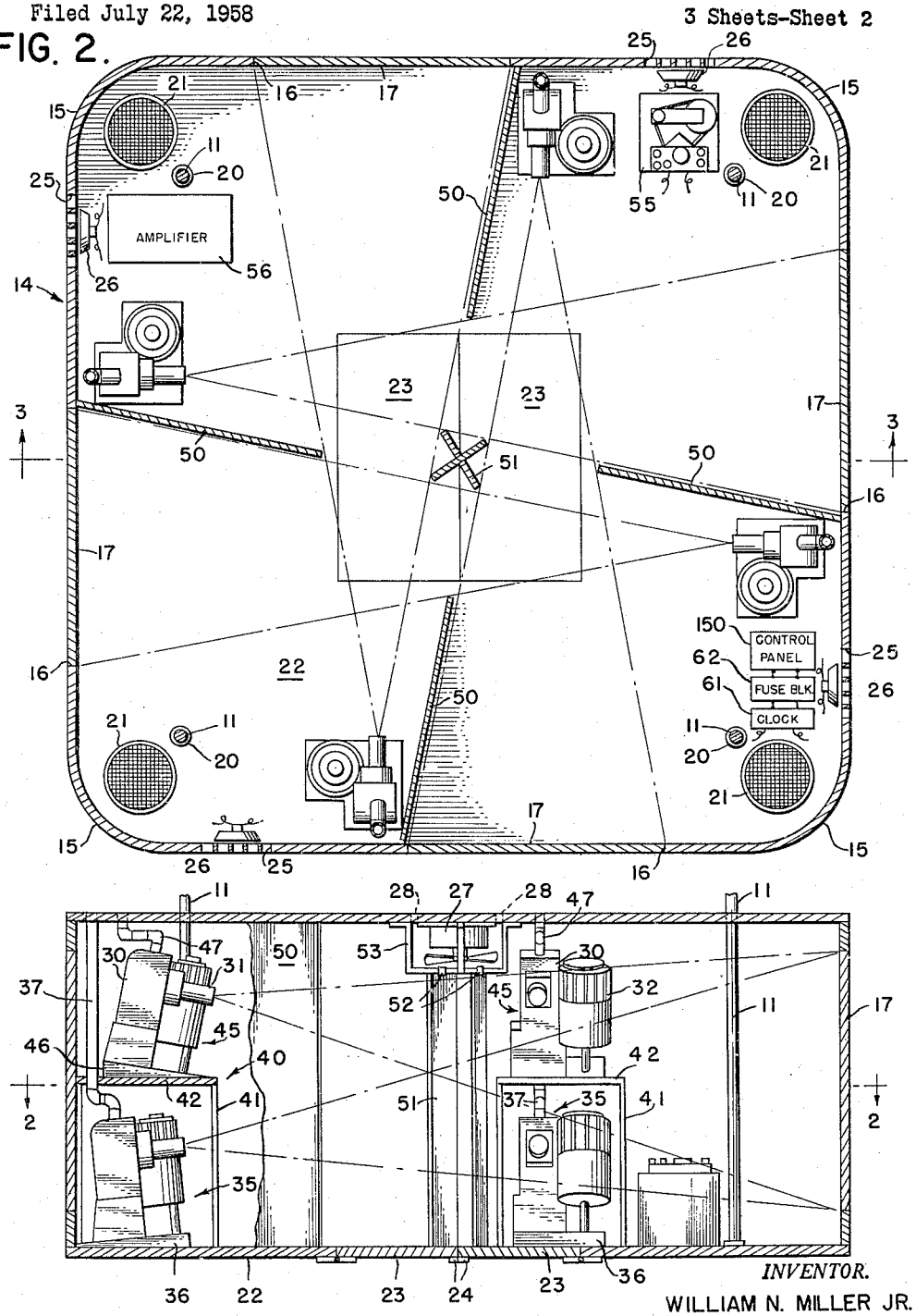
Fig. 2 is a top sectional view of the apparatus taken along line 2—2 of Fig. 3 looking in the direction of the arrows.
Fig. 3 is a sectional view taken along line 3—3 of Fig. 2 looking in the direction of the arrows.

As seen most clearly in Fig. 2 of the drawings, the body means 14 of the apparatus is substantially rectangular in configuration and has rounded corners 15. Four cut-out portions 16 are formed in each of the sides of the body means, a conventional rear projection screen 17 being mounted in each of the openings.

Four equally spaced plates 20 are fixed to the lower surface of the body means, and tubular members 11 are secured to the plates whereby the body means may be supported in elevated position. Four circular inlet openings 21 are provided through the lower wall 22 of the body means adjacent the four corners thereof, each of air inlet openings 21 being provided with a suitable grill for covering the opening and preventing the entrance of undesired foreign matter. At the center of the lower wall 22, a pair of trap doors 23 is hingedly connected to the bottom wall for providing access to the interior of the body means, the two trap doors being held together by suitable snap closure means 24.

As seen most clearly in Fig. 3, a fan 27 is mounted in the upper center portion of the body means, suitable openings 28 being spaced circumferentially about the fan for providing an outlet through the top of the body means whereby circulation of air is insured through the body means for cooling the interior thereof by sucking air up through openings 21 and out through openings 28 in the top wall of the body means.

Four loud speaker openings 25 having suitable grill work thereover are provided in the side walls of the body means and loud speakers 26 are mounted adjacent thereto for directing sound outwardly from the apparatus during operation.

The projectors employed in the present invention are of the automatic slide projection type identified commercially as "Selectroslide" manufactured by the Spindler and Sauppe Company of Los Angeles, California. As seen most clearly in Fig. 3 of the drawings, this type of projector includes a projector housing 30 having a lens 31 extending forwardly therefrom for projecting a picture, and a rotatable drum 32 is mounted adjacent the projector housing for storing a plurality of slides. Drum 32 contains a plurality of slide frames which are slidable radially thereof, the drum being rotated step by step in one direction and an arm causing the various slide frames to move radially into projecting position within the projector housing. The mode of operation of this type of projector is such that the slides contained in the various slide frames will be successively projected by the projector in a given sequence, and it is apparent that such sequence can be continually repeated as long as desired.

As seen in Fig. 3, a first plurality of projectors indicated generally by reference numeral 35 are supported on the lower wall of the body means, and are mounted in tilted position by support members 36 such that each projector is inclined so as to project a picture upon the screen 17 opposite thereto. Each of projectors 35 has a vent means 37 extending from the projector housing thereof up through the upper wall of the body means for cooling the interior of the projector.

A support stand indicated generally by reference numeral 40 is disposed about each of projectors 35 and comprises a plurality of legs 41 which support a top member 42. A second plurality of projectors indicated generally by reference numeral 45 are supported upon each of top members 42 and are maintained in a tilted position by support members 46 disposed thereunder whereby each of projectors 45 is disposed at such an angle that it projects an image in proper position on the screen means opposite thereto. Each of the second plurality of projectors 45 is provided with a vent means 47 extending from the interior of a projector housing through the upper wall of the body means for cooling the interior of the projector.

It is accordingly apparent that, for each screen means disposed at one side of the body means, there is a pair of projectors disposed at the opposite side of the body means and operatively associated therewith for projecting images upon such screen means, the pairs of projectors for each screen means being disposed one above the other to provide a compact arrangement whereby either projector of each pair of projectors may be alternatively energized for projecting upon the associated screen means.

In order to provide maximum efficiency of projection in the apparatus, it is desired to minimize the amount of light which can pass through one of the screens from the exterior of the apparatus and impinge upon the back of another of the screens. This is accomplished in the present invention by providing a novel baffle arrangement as seen most clearly in Fig. 2 wherein baffle members 50 formed of suitable light impervious material extend from the inner surface of the outer walls of the body means adjacent one edge of each of the screen means and extend substantially parallel to one outer boundary of the rays of the projected image of the adjacent screen. Baffle members 50 extend inwardly to a point closely adjacent the path of the rays of the projected image which is projected laterally with respect to each baffle means at a screen disposed at right angles to the screen from adjacent which the baffle extends. It is apparent from an inspection of Fig. 2 that baffle members 50 provide a maximum amount of protection from incoming light rays and at the same time do not interfere with the projection of the images from any projector to its associated screen.

There is another area in the center of the apparatus wherein a substantially cross-shaped baffle 51 is disposed and extends such that it does not interfere with the projection of the various images. Baffle 50 extends substantially from the upper wall to the lower wall of the body means, and baffle 51, as seen in Fig. 2, is supported by spring clip members 52 from a bracket 53 which extends downwardly in surrounding relationship to fan 27. Bracket 53 preferably comprises a pair of substantially U-shaped members disposed at right angles to one another.

The projectors employed in the present invention are adapted to be remotely controlled by suitable electrical control signals which produce a pulse causing the operating mechanism of the projector to produce rotation of the storage drum of the apparatus and to cause an operating arm to move radially and urge a slide frame into projecting position within the projector. In this manner, each control signal or pulse directed to the operating mechanism of the projector causes a new slide to be inserted in projecting position.

A magnetic tape recorder employed in the present invention is identified commercially by the trademark "Ekotape," Model 207 manufactured by the Webster Electric Company of Racine, Wisconsin. With this tape recorder, a special magazine or cartridge is employed which provides continuous operation whereby the tape will be constantly repeated and automatically rewound, thereby providing automatic message repetition of whatever is recorded on the tape. The type of cartridge employed with the aforedescribed tape recorder is identified commercially as "Audio Vendor," Model U–300–C manufactured by Cousino Inc. of Toledo, Ohio. With this arrangement, the commentary for the advertising material present on the slides of the projectors of the advertising units is prerecorded on the magnetic tape such that the tape will repeat as the slides are repeated by the projector mechanism. In order to produce changes of the slides and to synchronize the commentary with the operation of the projectors, control signals of, for example, one thousand cycles are placed on one half of the tape, and the commentary is recorded on the other half of the tape. When the tape is played back, a special amplifier converts the control signal into electrical energy which causes a pulse to operate the automatic projector.

Although it is apparent that various types of sound reproducing mechanisms may be employed with suitable trigger means for operating the projectors, it is considered preferable to employ the magnetic tape recorders as disclosed herein because of their relative simplicity and the positive synchronization obtained between the sound and the operation of the projectors.

Figure 4:
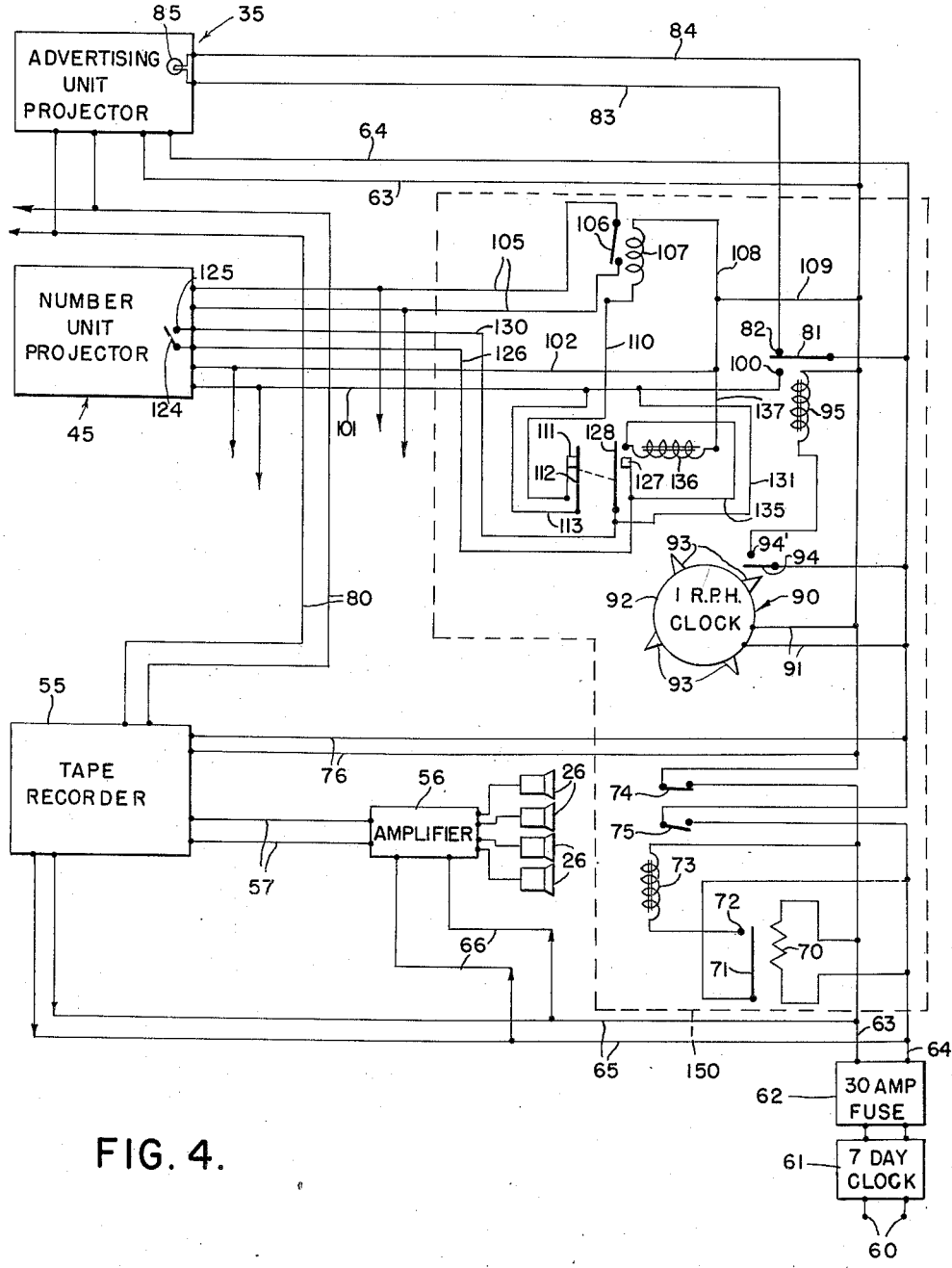
Fig. 4 is a schematic wiring diagram of the electrical circuit of the apparatus.

Referring now to Fig. 4 of the drawings, the electrical circuit including the sound reproducing apparatus and the control system according to the present invention are more clearly illustrated. The aforedescribed tape recorder is indicated by reference numeral 55, one of the advertising unit projectors being indicated by reference numeral 35, and one of the number unit projectors being indicated by reference numeral 45. The four loud speakers 26 are connected to the output of an intermediate amplifier 56 which is, in turn, connected to the output of tape recorder 55 by a pair of leads 57.

The input terminals 60 of the circuit shown in Fig. 4 are adapted to be connected to any conventional source of 60 cycle 110 volt of electrical energy. A seven-day clock 61 is connected to terminal 60 and is provided with suitable contacts for turning the entire apparatus on and off in accordance with the desired hours of operation throughout the week. The output of clock 61 is connected to a fuse box 62 for preventing excessive current greater than a predetermined value, such as 30 amps. The output of fuse box 62 is connected to a pair of leads 63 and 64, which are in turn connected through a pair of leads 65 and a pair of leads 66 to the amplifier of tape recorder 55 and amplifier 56. It is accordingly apparent that when the circuit is energized by closing of a switch in the seven-day clock 61, the circuit will immediately be closed to the amplifier 56 and through the amplifier portion of the tape recorder 55, whereby these amplifiers will immediately begin to warm up.

A heating element 70 is connected across leads 63 and 64, and heating element 70 is adapted to cause bimetallic switch 71, which is normally in open position, to close the circuit through contact 72 when heating element 70 heats up. When the circuit through contact 72 is closed, a relay 73 is energized causing switches 74 and 75, which are normally open, to be closed and to remain closed as long as the circuit is energized. It is apparent that switch 74 closes the circuit through lead 63 to the elements shown in the upper portion of the wiring diagram, and switch 75 closes the circuit through lead 64 to the elements shown in the upper portion of the wiring diagram. Until switches 74 and 75 are closed, the control circuit itself is not energized, but the amplifiers are merely allowed to warm up.

Upon closing of switches 74 and 75, the circuit is closed through a pair of leads 76 to the tape transport mechanism of the tape recorder thereby causing the tape to move between the sensing heads of the recorder. At the same time, circuit is completed through leads 63 and 64 to the slide transport operating mechanism of the advertising unit projector 35 thereby energizing the operating mechanism of projectors 35 readying the projectors 35 for operation to change the slide within the projector. When a suitable signal is reached on the tape within tape recorder 55, a pulse will pass through a pair of leads 80 from the tape recorder to projector 35 for causing the slide to be changed within the projector in synchronism with the change in the commentary on the tape.

A switch 81 is normally biased into position as shown with a contact 82 whereby a circuit is closed through leads 83 and 84 to the lamp 85 of projector 35 such that whenever switch 81 is in the position shown, the slide in projecting position within projector 35 will be projected upon the associated screen means. It is accordingly apparent that when the circuit is initially energized as shown and switch 71 is closed, the tape recorder and the advertising unit projector 35 will be energized and the projector 35 will project images upon the associated screen means.

The control circuit also includes means for periodically discontinuing the projection of projector 35 and causing projection of projector 45, and such mechanism will now be described. A clock mechanism indicated by reference numeral 90 is connected through a pair of leads 91 to leads 63 and 64, clock 90 being electrically operated and geared to turn a predetermined desired rate as, for example, one revolution per hour. Clock 90 includes a rotatable drum 92 having suitably mounted on the exterior surface thereof small projections 93, the position of which may be selectively adjusted. A normally open switch 94 is adapted to close a circuit through a relay coil 95 when drum 92 rotates into such a position that one of projections 93 engages the outer end of switch 94. Projections 93 are adapted to maintain switch 94 closed for a relatively short period of time, whereupon switch 94 is again urged into open position by suitable resilient means such as a spring or the like. It is apparent that by adjusting the positions of projections 93 upon the circumference of drum 92, the time interval between closings of switch 94 may be selectively adjusted, and although four projections 93 have been disclosed, it is apparent that any number of projections may be employed in accordance with the frequency with which it is desired to close switch 94. Upon closing of switch 94, relay coil 95 is energized causing switch 81 to be disengaged from contact 82 and causing switch 81 to engage a contact 100. When the switch 81 engages contact 100, a circuit is closed through leads 101 and 102 through the slide transport and lamp circuit of projector 45, thereby causing the projector to change the slide therein and project the slide on the associated screen means.

The control switch of projector 45 is connected through a pair of leads 105 to a switch 106 which is normally biased by suitable means into open position. A relay coil 107 is adapted to close switch 106, relay 107 being connected through leads 108 and 109 to lead 63 and being connected through leads 110 to a contact 111 of a normally closed switch 112 which is connected through leads 113, 101 and switch 81 to lead 64. It is accordingly evident that upon closure of switch 81, the circuit will be completed through coil 107 thereby causing switch 106 to close. This produces the pulse in the control system of the projector causing the slide transport mechanism thereof to move a slide radially outward into projecting position.

Figure 5:
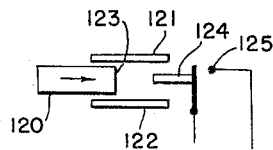
Fig. 5 is an enlarged somewhat schematic view, illustrating the microswitch means of the apparatus.

As seen in Fig. 5, one of the slide frames is indicated by reference numeral 120 and passes between guide members 121 and 122. The outer end 123 of each slide frame is adapted to engage pivoted microswitch member 124 to move the switch 124 into engagement with contact 125, thereby closing the circuit through the normally open microswitch.

Referring again to Fig. 4, microswitch 124 is connected through lead 126 to a contact 127 adapted to be engaged by normally open switch member 128. Contact 125 of the microswitch is connected through lead 130 to switch member 128 and is in turn connected through lead 131 to lead 101.

Microswitch 124 is normally biased to open position, and when engaged by the outwardly moving slide in the associated number unit projector, closing a circuit through lead 126 and lead 135 through a relay coil 136 which is in turn connected through lead 137 to lead 102. It is accordingly evident that microswitch 124 is closed, coil 136 is energized thereby opening switch 112 and closing switch 128.

The mode of operation of the control switch for the number unit projector 45 is as follows. Switch 81 is normally biased into the position shown where the advertising unit projector 35 is energized and the number unit projector 35 is de-energized. Upon closing of switch 94 by clock means 90, coil 95 is energized and switch 81 is closed. Upon closure of switch 81, the circuit is closed through leads 101 and 102 to number unit projector 45 and the lamp unit of advertising projector 35 is de-energized, thereby discontinuing projection by the advertising unit projector. Simultaneously with energization of the slide transport and lamp of number unit projector 45, the circuit is closed through coil 107 causing switch 106 to close thereby producing a pulse for causing movement of the transport mechanism of projector 45. This is caused when switch 112 is normally in closed position as shown. Upon outward movement of the slide frame within the number unit projector, microswitch 124 is closed, thereby closing the circuit through coil 136 opening switch 112 and closing switch 128. When switch 112 opens, the circuit through coil 107 is opened and switch 106 is released and biased back to open position. This opening of switch 106 insures that only one cycle of operation of number unit projector 45 takes place.

Closing of switch 128 upon energization of coil 136 insures that switch members 128 and 111 which are connected in tandem remain respectively in closed and opened positions after microswitch 124 is open. Coil 136 will remain energized since the circuit is closed therethrough by switch member 128 as long as switch 81 remains in engagement with contact 100.

After projection 93 has passed switch member 94, switch member 94 is biased out of engagement with its associated contact 94' thereby de-energizing coil 95 and allowing switch 81 to be biased back into position in contact with contact 82. When this occurs, the circuit through contact 100 is broken and coil 136 is de-energized allowing switch 112 to again be biased into closed position and switch 128 to be biased into open position. The advertising unit projector 35 will then subsequently be operated until another projection 93 of clock means 90 again causes closing of switch means 94. While only one advertising unit projector 35 and one number unit projector 45 are shown, it is apparent that any number of such projectors may be connected in tandem as desired, and suitable leads extend from the control circuit for actuating additional units shown as being four in number in the present application. It is evident that the lamps of all four advertising unit projectors 35 must be simultaneously de-energized, and that the slide transport and lamp mechanisms of each of number unit projectors 45 must be simultaneously energized and de-energized. Only one microswitch 124 is necessary for operating the control circuits for all four of the number unit projectors.

It is apparent from the foregoing description that the advertising unit projectors 35 will normally be in operation and that one cycle of the number unit projectors 45 will be intermittently produced by the timing mechanism 90. When the number unit projectors are energized, the lamp units of the advertising projectors are de-energized, but the slides in the advertising unit projector will continue to be changed in synchronism with the continuously operating tape recorder 55.

Referring again to Fig. 2, the disposition of the amplifier 56, tape recorder 55, clock 61 and fuse box 62 within the body means is clearly shown. A control panel indicated by reference numeral 150 and as indicated by dotted lines in Fig. 4 contains the relays and clock of the control circuit.

It is also considered preferable to provide a time delay mechanism for delaying the turning off of the blower mechanisms in the projectors when the circuit is de-energized. Such time delay means will enable the projectors to be more efficiently cooled and will insure that the films within the storage drum of the apparatus will not be damaged by excessive heat generated within the projector. It is also apparent that suitable means may be provided for adjusting the volume from the output of the loud speakers of the apparatus as desired. Such volume control may either be manual such that it can be controlled by the store manager, or it may be automatic such that the volume of the sound varies in accordance with the noise level in the store, thereby insuring that the customers will be able to adequately hear the commentary at all times.

It is apparent from the foregoing that there is provided a new and novel display apparatus which is adapted to be mounted in a central position in a store to provide a visual and audio advertising presentation to customers in the store and which can be viewed from substantially all directions thereabuot. Advertising material and bonus numbers or symbols are automatically projected upon the viewing areas of the screen means of the apparatus, and the sound reproduction system produces sound in timed synchronism with the advertising images projected on the screen means. The frequency and distribution of the numbers may be adjusted at will, and the display apparatus is quite simple and inexpensive in construction, yet is efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Display apparatus which comprises screen means facing in a plurality of directions such that portions of the screen means may be observed from different angles, first slide projection means for simultaneously projecting a plurality of similar images on said screen means from the rear thereof, second slide projection means for simultaneously projecting a plurality of similar images on said screen means from the rear thereof different from the images projected by said first projection means, and sound reproducing means associated with said first projection means for controlling the operation of said first projection means and producing audible sound in timed relationship to the images projected by said first projection means, and control means for controlling the operation of said second projection means, said control means when energized causing only one cycle of operation of said second projection means and then continuing projection of said first projection means after completion of said one cycle of operation of said second projection means.

2. Apparatus as defined in claim 1 wherein each of said first and second slide projection means includes a plurality of slide projectors operating in synchronism with one another, said slide projection means each being intermittently operated such that said first and second slide projection means are alternatively operated.

3. Display apparatus comprising a hollow body means having outer surfaces, screen means supported by said body means and including a plurality of viewing areas disposed adjacent the outer surfaces of said body means, a first plurality and a second plurality of slide projectors supported by said body means and disposed inwardly of the outer surfaces thereof, one of said first plurality of projectors and one of said second plurality of projectors being associated with each of said viewing areas for projecting images on the associated viewing areas, sound reproducing apparatus supported by said body means and being associated with said first plurality of projectors for controlling the operation thereof and for producing sound in timed relationship with the images projected by said first plurality of projectors, and control means for controlling the operation of said second plurality of projectors such that said first and second plurality of projectors are alternatively operated, said first plurality of projectors being normally in operation and said second plurality of projectors being energized to cause one cycle of operation of said second plurality of projectors periodically upon de-energization of said first plurality of projectors for projecting different images on said viewing areas for a predetermined period of time, and said first plurality of projectors continuing projection after completion of said one cycle of operation of said second plurality of projectors.

4. Apparatus as defined in claim 3 wherein said body means includes baffle means adjacent each of said projectors and baffle means disposed in the center of said body means for providing images of maximum contrast on each of the viewing areas.

5. Apparatus as defined in claim 3 wherein the pair of projectors associated with each of said viewing areas is disposed at opposite portions of the body means from the associated viewing areas and is positioned one above the other.

6. Display apparatus which comprises a hollow body means adapted to be supported in an elevated position in a central location in a store, a plurality of angularly spaced screens supported by said body means in position to be observed by customers in the store, a first plurality of projectors for simultaneously projecting identical images on each of said screens, a second plurality of projectors for simultaneously projecting identical images on said screens different from the images projected by said first plurality of projectors, and each of said projectors including a plurality of slide frames which are successively movable into projecting position within the associated projector, sound reproducing apparatus associated with said first plurality of projectors for causing movement of successive slide frames of each of said projectors into projecting position and for continuously producing audible sound which may be heard by customers within the store, said projectors and said sound apparatus being supported within the interior of said body means, and control means supported within said body means for intermittently discontinuing projection of said first plurality of projectors and causing one cycle of operation of said second plurality of projectors for projecting a slide contained in one slide frame of each of said second plurality of projectors and then subsequently continuing projection of said first plurality of projectors, said control means including timing means for causing operation of said second plurality of projectors at predetermined time intervals.

7. Apparatus as defined in claim 6 wherein said control means for causing one cycle of operation of said second plurality of projectors includes switch means operated upon movement of the slide frame into projecting position in one of said second plurality of projectors and a relay operated switch which is controlled by the operation of said first mentioned switch means.

8. Apparatus as defined in claim 7 wherein said control means comprises an electric circuit including time delay means for preventing energization of said projectors during a predetermined time interval after the circuit is energized.

9. Display apparatus comprising a hollow body means adapted to be supported in an elevated position in a store, screen means supported by said body means and facing in a plurality of directions such that the screen means may be observed from a plurality of different locations within the store, a first plurality of projectors for simultaneously projecting identical images on said screen means, a second plurality of projectors for simultaneously projecting identical images on said screen means different from the images projected by said first plurality of projectors, each of said projectors including a plurality of slide carriers which are successively movable into projecting position within the associated projector, sound reproducing apparatus associated with said first plurality of projectors for causing movement of successive slide carriers of each of said first plurality of projectors into projecting position and for continuously producing audible sound which may be heard by customers in the store, said projectors and said sound apparatus being supported by said body means, and control means supported by said body means connected with said second plurality of projectors for causing one cycle of operation of said second plurality of projectors to project a slide contained in one slide carrier of each of said second plurality of projectors, and then continuing projection of said first plurality of projectors after completion of said one cycle of operation of said second plurality of projectors.

10. Apparatus as defined in claim 9, wherein said control means includes an adjustable timing means for causing intermittent operation of said second plurality of projectors at predetermined time intervals.

References Cited in the file of this patent

UNITED STATES PATENTS

| | | |
|---|---|---|
| 1,903,950 | Weinberger | Apr. 18, 1933 |
| 1,931,668 | Maurer | Oct. 24, 1933 |
| 1,957,947 | Dreyfuss | May 8, 1934 |
| 2,267,689 | Smith | Dec. 23, 1941 |
| 2,699,089 | Jakobs et al. | Jan. 11, 1955 |